(12) United States Patent
Mchatet

(10) Patent No.: US 9,928,949 B1
(45) Date of Patent: Mar. 27, 2018

(54) CABLE WITH MAGNETIC MOUNTING ASSEMBLY

(71) Applicant: Hamid Mchatet, Miami, FL (US)

(72) Inventor: Hamid Mchatet, Miami, FL (US)

( * ) Notice: Subject to any disclaimer, the term of this patent is extended or adjusted under 35 U.S.C. 154(b) by 0 days.

(21) Appl. No.: 15/483,308

(22) Filed: Apr. 10, 2017

(51) Int. Cl.
*H01F 7/02* (2006.01)
*H02G 3/04* (2006.01)

(52) U.S. Cl.
CPC .......... *H01F 7/0252* (2013.01); *H02G 3/0456* (2013.01)

(58) Field of Classification Search
USPC ........... 307/104; 191/12.2; 439/4; 242/378.1
See application file for complete search history.

(56) References Cited

U.S. PATENT DOCUMENTS

| | | | | |
|---|---|---|---|---|
| 4,378,473 A * | 3/1983 | Noorigian | .......... | B65H 75/4428 191/12.2 R |
| 4,897,873 A * | 1/1990 | Beutler | ............... | H04M 1/0216 16/292 |
| 6,254,025 B1 * | 7/2001 | Liao | .................... | B65H 75/4434 242/378.1 |
| 6,305,632 B1 * | 10/2001 | Hwang | ................. | B65H 75/486 242/372 |
| 7,959,444 B2 * | 6/2011 | Corless | .................. | H01R 13/72 439/35 |
| 9,577,467 B1 * | 2/2017 | Karanikos | ............... | H02J 7/025 |
| D786,876 S * | 5/2017 | Huang | .......................... | D14/433 |
| 2002/0053622 A1 * | 5/2002 | Kagel | .................... | A45F 5/004 242/379 |
| 2007/0086613 A1 * | 4/2007 | Chang | ...................... | H04R 5/02 381/333 |
| 2009/0243396 A1 * | 10/2009 | Randall | .............. | H01R 13/2421 307/104 |
| 2011/0018360 A1 * | 1/2011 | Baarman | .................. | H02J 5/005 307/104 |
| 2011/0071597 A1 * | 3/2011 | Aghassian | .......... | A61N 1/37235 607/61 |
| 2012/0048983 A1 * | 3/2012 | Bianco | ................. | B60L 11/1818 242/388.9 |
| 2012/0112553 A1 * | 5/2012 | Stoner, Jr. | ............... | H02J 5/005 307/104 |
| 2014/0035381 A1 * | 2/2014 | Chen | ....................... | H02J 5/005 307/104 |
| 2015/0290373 A1 * | 10/2015 | Rudser | ................ | A61M 1/1086 623/3.27 |

* cited by examiner

*Primary Examiner* — William H Mayo, III
*Assistant Examiner* — Krystal Robinson
(74) *Attorney, Agent, or Firm* — Albert Bordas, P.A.

(57) ABSTRACT

A cable with magnetic mounting assembly has a base assembly, an internal support, a magnet, a friction member, and a cover assembly. The base assembly has an external base face, an exterior lateral face and an internal base face. The exterior lateral face has a base edge, lateral hollow protrusions, and internal lateral protrusions. The internal base face has internal walls and a base channel between them. The internal support has an internal face, a sidewall, and a magnet base. The internal face has slots, and a support channel between them. The friction member has a ring base with elongated protrusions. The cover assembly has a cover edge, a cover lateral wall and a concave face. The base assembly and the cover assembly house the internal support, the magnet, and the friction member. The concave face mounts onto any surface attracted to the magnet.

16 Claims, 4 Drawing Sheets

CABLE WITH MAGNETIC MOUNTING ASSEMBLY

BACKGROUND OF THE INVENTION

1. Field of the Invention

The present invention relates to electronic accessories, and more particularly, to cables with magnetic mounting assemblies.

2. Description of the Related Art

Applicant is not aware of any cable with magnetic mounting assemblies having the novel features of the present invention.

SUMMARY OF THE INVENTION

The present invention is a cable with magnetic mounting assembly, comprising a base assembly, an internal support, a magnet, a friction member, and a cover assembly.

The base assembly comprises an external base face, an exterior lateral face and an internal base face. The exterior lateral face comprises a base edge, first and second lateral hollow protrusions, and first and second internal lateral protrusions. The internal base face comprises first and second internal walls and a base channel between them; wherein first and second internal walls extend along the internal base face and are approximately parallel to each other. The base channel extends along the internal base face and aligns with respective first and second lateral hollow protrusions.

The internal support comprises an internal face, a sidewall, and a magnet base. The internal face comprises first and second slots, and a support channel between them; wherein the first and second slots extend along the internal face and are approximately parallel to each other. The support channel extends along the internal face. The sidewall comprises first and second external lateral slots. The magnet is positioned onto the magnet base.

The friction member comprises a ring base with elongated protrusions. The cover assembly comprises a cover edge, a cover lateral wall and a concave face. The concave face comprises an edge having elongated slots. The internal support is positioned within the base assembly, whereby the support channel and the base channel align to form an elongated cavity to receive a cable therethrough. The slots receive respective first and second internal walls therein. The friction member is mounted internally within the cover assembly, and the elongated protrusions protrude from the elongated slots.

The cover edge has a first predetermined diameter that is approximately the same as a second predetermined diameter of the base edge. The base assembly and the cover assembly house the internal support, the magnet, and the friction member. The concave face mounts onto any surface attracted to the magnet.

It is therefore one of the main objects of the present invention to provide a cable with magnetic mounting assembly, which can be positioned onto any surface attracted to a magnet.

It is another object of this invention to provide a cable with magnetic mounting assembly that is compact and of high quality.

It is another object of this invention to provide a cable with magnetic mounting assembly, which is of a durable and reliable construction.

It is yet another object of this invention to provide a cable with magnetic mounting assembly that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
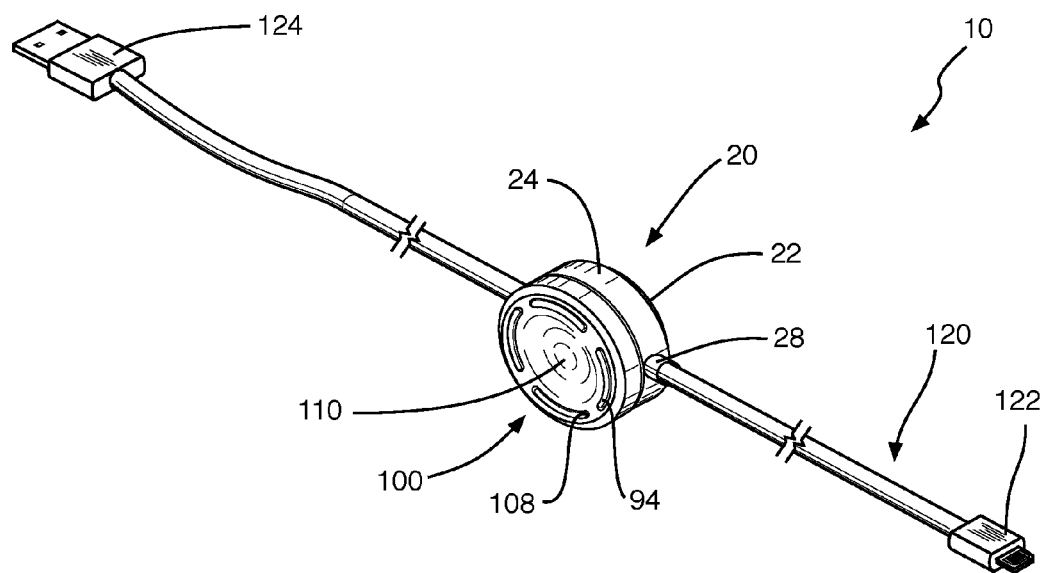
FIG. 1 is an isometric view of the present invention.

Referring now to the drawings, the present invention is a cable with magnetic mounting assembly and is generally referred to with numeral 10. It can be observed that it basically comprises base assembly 20, internal support 50, magnet 80, friction member 90, and cover assembly 100.

Figure 2:
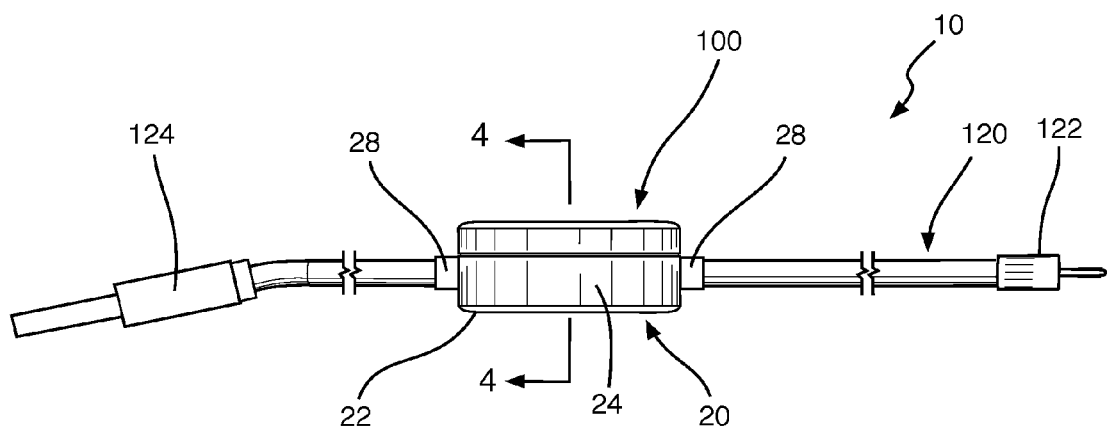
FIG. 2 is a side view of the present invention.

As seen in FIGS. 1 and 2, base assembly 20 and cover assembly 100 are secured onto cable 120. In a preferred embodiment, base assembly 20 and cover assembly 100 are permanently fixed onto cable 120, such as with an adhesive. Lateral hollow protrusions 28 define holes to receive cable 120 therethough. Cable 120 has first and second ends. Cable 120 may be any electronics cord utilized for charging computers such as, but not limited to, smart phones, tablets, electronic devices, electronic accessories, cameras, etc. In addition, cable 120 may be any electronics cord utilized for transferring data from one electronic device to another, and/or one computer to another, such as, but not limited to, smart phones, tablets, electronic devices, electronic accessories, cameras, etc. For purposes of illustration and as an example, connector 122 can be coupled at the first end, and USB connector 124 can be coupled at the second end.

Figure 3:
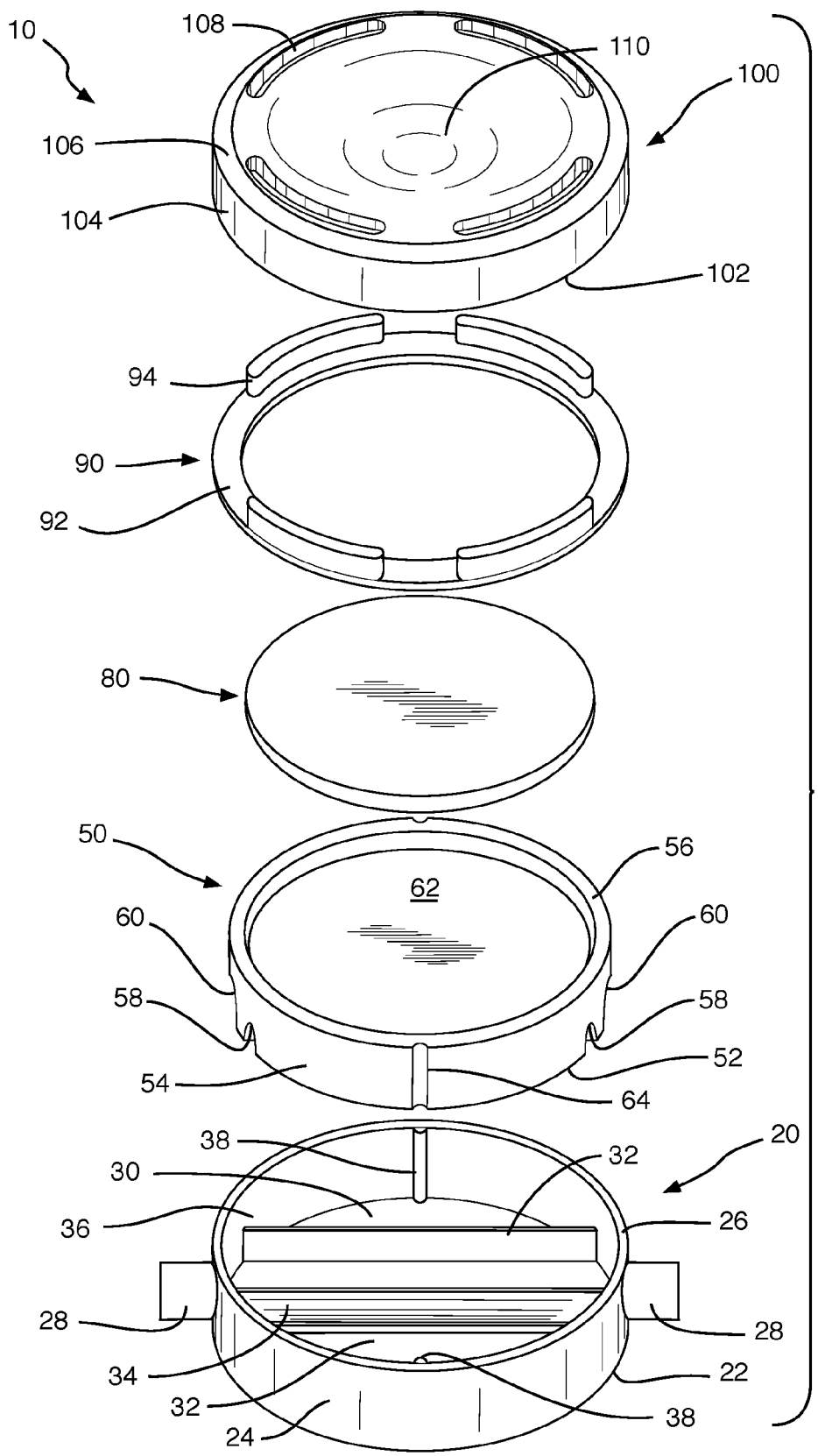
FIG. 3 is an exploded view of the present invention.

As seen in FIG. 3, base assembly 20 comprises external base face 22, exterior lateral face 24, internal base face 30, and interior lateral face 36. Exterior lateral face 24 comprises base edge 26, first and second lateral hollow protrusions 28, and first and second internal lateral protrusions 38. Internal base face 30 comprises first and second internal walls 32, and base channel 34 between them. First and second internal walls 32 each have first and second ends and extend along internal base face 30 to contact interior lateral face 36 with their respective ends. In addition, first and second internal walls 32 are approximately parallel to each other. Base channel 34 extends along internal base face 30 and aligns with holes defined by respective first and second lateral hollow protrusions 28.

Internal support 50 comprises internal face 52, sidewall 54, support edge 56, and magnet base 62. Sidewall 54 extends from support edge 56 and has first and second external lateral slots 64. Sidewall 54 further has defined slots 58 and support channel 60.

Friction member 90 comprises ring base 92 with elongated protrusions 94. Friction member 90, and particularly elongated protrusions 94, are made of rubber, a rubber composition, or any material with similar rubber characteristics for friction.

Cover assembly 100 comprises cover edge 102, cover lateral wall 104, and concave face 110. Concave face 110 has edge 106 having elongated slots 108.

Figure 4:
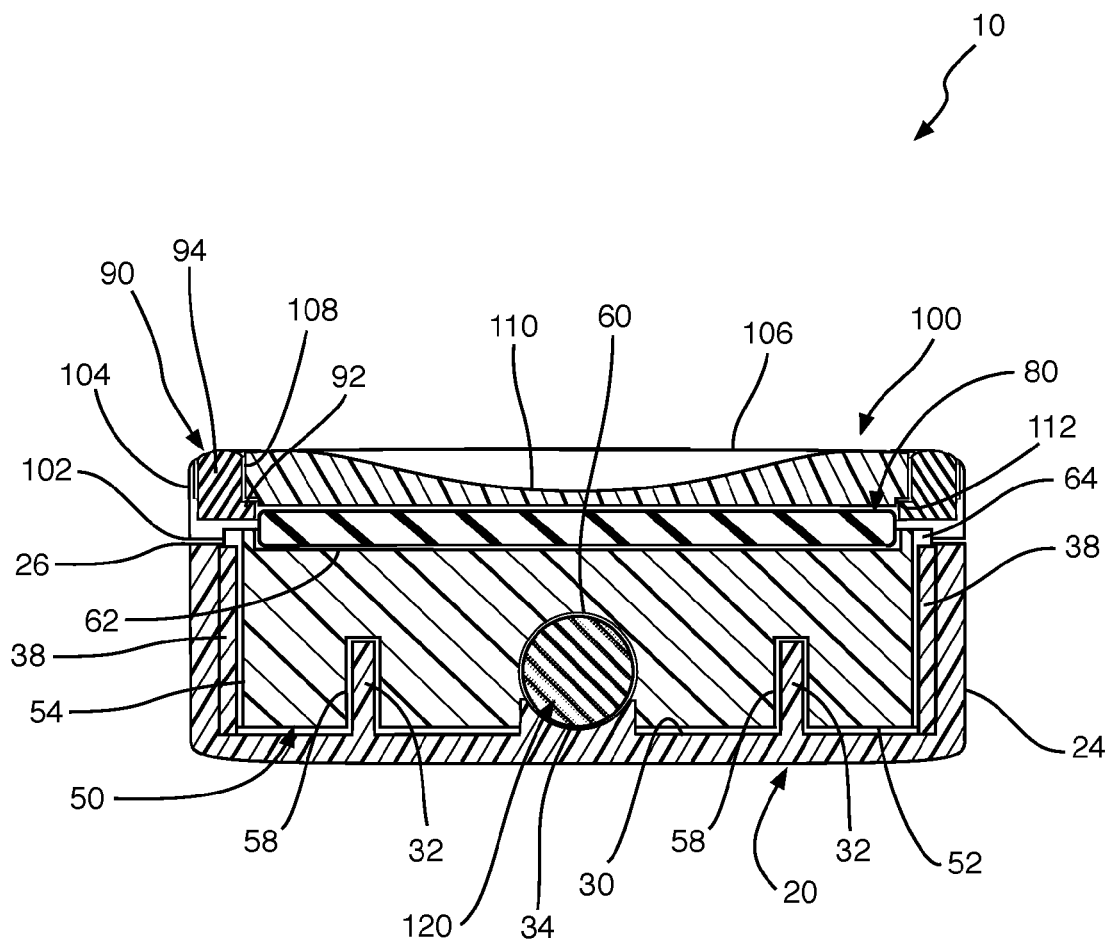
FIG. 4 is a cut view of the present invention taken along the lines 4-4 as seen in FIG. 2.

As seen in FIG. 4, internal support 50 is positioned within base assembly 20. Internal face 52 comprises first and second slots 58, and support channel 60 between them. First and second slots 58 extend across internal face 52 to each side of sidewall 54, and are approximately parallel to each other. It is noted that only one slot 58 is illustrated in FIG. 3. Support channel 60 also extends across internal face 52 to each side of sidewall 54, as seen in FIG. 3. Support channel 60 and base channel 34 align to form an elongated cavity. The elongated cavity aligns with respective first and second lateral hollow protrusions 28, as seen in FIG. 3, to receive cable 120 therethrough. Slots 58 receive respective internal walls 32 therein, and external lateral slots 64 receive respective internal lateral protrusions 38 therein.

In a preferred embodiment, interior lateral face 36, seen in FIG. 3, has a third predetermined diameter, and internal support 50 has a fourth predetermined diameter. The third predetermined diameter is slightly larger than the fourth predetermined diameter to allow internal support 50 to snap within interior lateral face 36.

Magnet 80 is positioned onto magnet base 62, whereby magnet 80 snaps into, and is secured within a cavity formed by magnet base 62. Magnet 80 has a first predetermined height and the cavity formed by magnet base 62 has a first predetermined depth. The first predetermined height is slightly greater than the first predetermined depth; therefore magnet 80 slightly protrudes from the cavity formed by magnet base 62.

Friction member 90 is mounted internally within cover assembly 100, and abuts an opposite side of concave face 110 until elongated protrusions 94 protrude from respective elongated slots 108 a predetermined amount. Cover assembly 100 comprises notch 112 on the opposite side of concave face 110. Notch 112 snaps or fits onto ring base 92. Concave face 110 covers magnet 80.

Cover edge 102 has a first predetermined diameter that is approximately the same as a second predetermined diameter of base edge 26 enabling exterior lateral face 24 and cover lateral wall 104 to be flush when cover assembly 100 and base assembly 20 are joined. In a preferred embodiment, an adhesive is applied onto cover edge 102 and base edge 26 to allow cover assembly 100 and base assembly 20 to join. When assembled, base assembly 20 and cover assembly 100 house internal support 50, magnet 80, and friction member 90.

Figure 5:
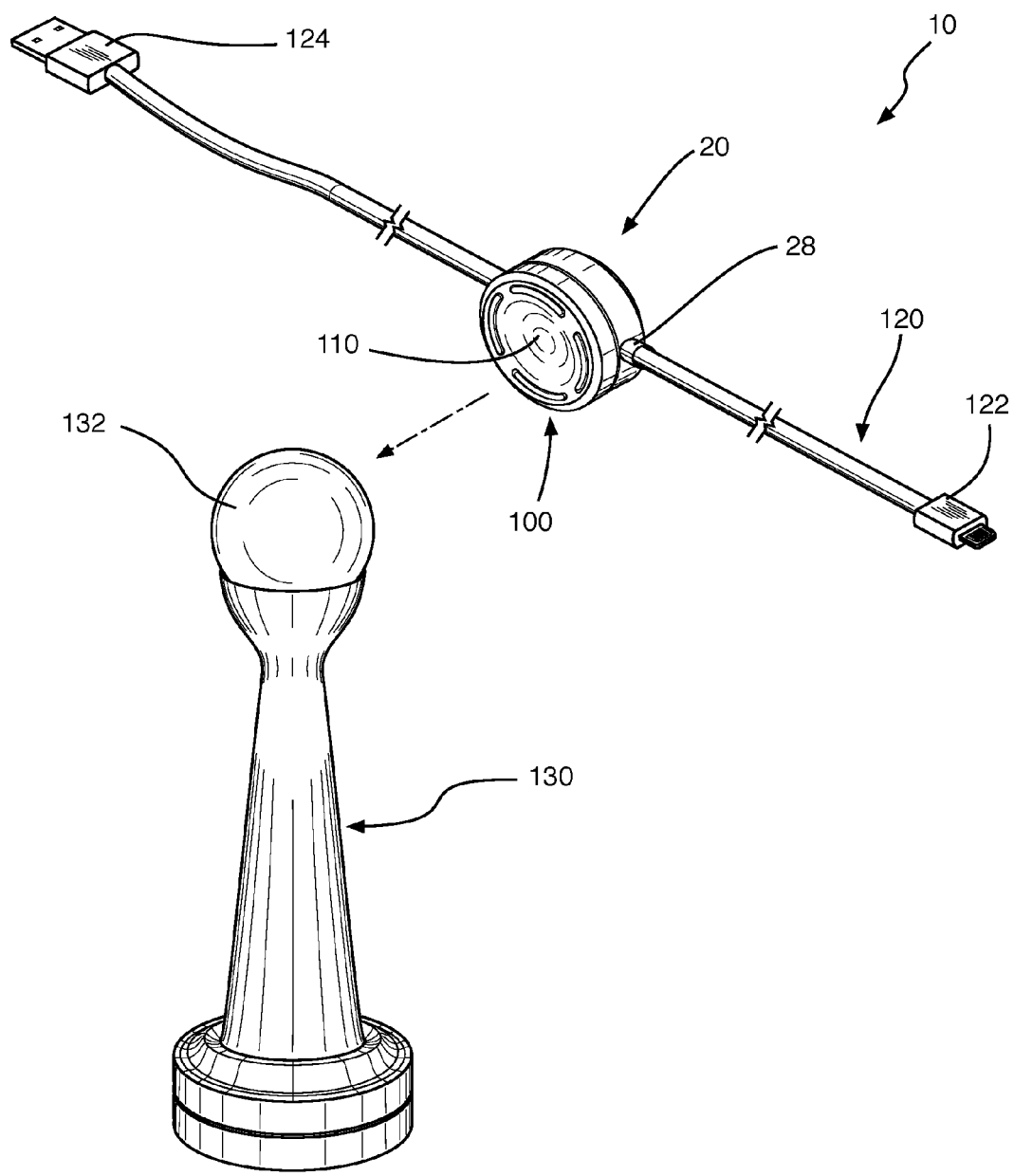
FIG. 5 is an isometric view of the present invention being mounted onto a base assembly.

As seen in FIG. 5, cable with magnetic mounting assembly 10 may be mounted, whereby concave face 110 is placed onto any surface attracted to magnet 80, seen in FIG. 4. In a preferred embodiment, concave face 110 is mounted onto metal sphere 132, which can be positioned on base 130.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A cable with magnetic mounting assembly, comprising:
   A) a base assembly comprising an external base face, an exterior lateral face, and an internal base face, said exterior lateral face comprises a base edge, first and second lateral hollow protrusions, and first and second internal lateral protrusions, said internal base face comprises first and second internal walls and a base channel between them;
   B) an internal support comprising an internal face, a sidewall, and a magnet base;
   C) a magnet;
   D) a friction member; and
   E) a cover assembly.

2. The cable with magnetic mounting assembly set forth in claim 1, further characterized in that said first and second internal walls extend along said internal base face and are approximately parallel to each other.

3. The cable with magnetic mounting assembly set forth in claim 1, further characterized in that said base channel extends along said internal base face and aligns with respective said first and second lateral hollow protrusions.

4. The cable with magnetic mounting assembly set forth in claim 1, further characterized in that said internal face comprises first and second slots, and a support channel between them.

5. The cable with magnetic mounting assembly set forth in claim 4, further characterized in that said first and second slots extend along said internal face and are approximately parallel to each other.

6. The cable with magnetic mounting assembly set forth in claim 4, further characterized in that said support channel extends along said internal face.

7. The cable with magnetic mounting assembly set forth in claim 4, further characterized in that said internal support is positioned within said base assembly, whereby said support channel and said base channel align to form an elongated cavity to receive a cable therethrough.

8. The cable with magnetic mounting assembly set forth in claim 4, further characterized in that said first and second slots receive respective said first and second internal walls therein.

9. The cable with magnetic mounting assembly set forth in claim 1, further characterized in that said sidewall comprises first and second external lateral slots.

10. The cable with magnetic mounting assembly set forth in claim 1, further characterized in that said friction member comprises a ring base with elongated protrusions.

11. The cable with magnetic mounting assembly set forth in claim 10, further characterized in that said cover assembly comprises a cover edge, a cover lateral wall and a concave face.

12. The cable with magnetic mounting assembly set forth in claim 11, further characterized in that said concave face comprises an edge having elongated slots.

13. The cable with magnetic mounting assembly set forth in claim 12, further characterized in that said friction member is mounted internally within said cover assembly, and said elongated protrusions protrude from said elongated slots.

14. The cable with magnetic mounting assembly set forth in claim 11, further characterized in that said cover edge has a first predetermined diameter that is approximately the same as a second predetermined diameter of said base edge, and said base assembly and said cover assembly house said internal support, said magnet, and said friction member.

15. The cable with magnetic mounting assembly set forth in claim 11, further characterized in that said concave face mounts onto any surface attracted to said magnet.

16. The cable with magnetic mounting assembly set forth in claim 1, further characterized in that said magnet is positioned onto said magnet base.

\* \* \* \* \*